Figure 1:
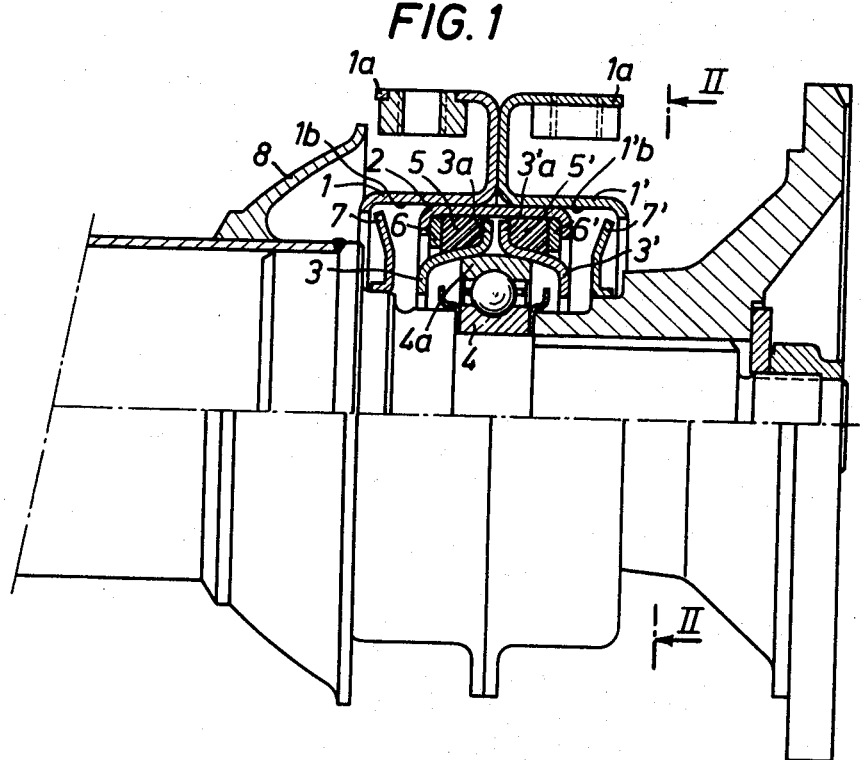

United States Patent [19]
Mangiavacchi

[11] 3,756,675
[45] Sept. 4, 1973

[54] BEARING

[75] Inventor: Jacques Mangiavacchi, Chatou, France

[73] Assignee: Societa Anonyme: Glaenzer Spicer, Poissy, France

[22] Filed: July 7, 1972

[21] Appl. No.: 269,573

[30] Foreign Application Priority Data
Feb. 28, 1972 France .............................. 7206708

[52] U.S. Cl. ................................. 308/184, 308/194
[51] Int. Cl. ........................................... F16c 27/00
[58] Field of Search ................... 308/184, 194, 176

[56] References Cited
UNITED STATES PATENTS
1,152,681   9/1915   Wieselgreen ...................... 308/184

*Primary Examiner*—Charles J. Myhre
*Assistant Examiner*—Frank Susko
*Attorney*—Donald M. Wight et al.

[57] ABSTRACT

A bearing comprises a ball-race received in a sliding element, the sliding element and an armature being located within a casing. The armature and the sliding element are adapted to allow the ball-race to move axially along a shaft passing through it and angularly about its centre. The casing may comprise two symmetrical portions defining an internal cylindrical guide surface on which the cylindrical armature can slide, the sliding element comprising two cups with part-spherical internal faces on which the external ring of the ball-race can slide, this outer ring having a part-spherical outer surface with the same radius as the internal surface of the cups. Alternatively the casing may include two symmetrical portions defining a part-spherical internal surface, the armature being in two pieces having a peripheral part-spherical surface of the same radius as the part-spherical surface of the casing, the armature enclosing a cylindrical ring in which is located for sliding movement a conventional ball bearing. Elastic means are inserted between the armature and the sliding elements to take up play. Protective elements may be placed inside and outside the casing to protect the bearing against solid or liquid impurities.

4 Claims, 3 Drawing Figures

BEARING

The present invention concerns a bearing allowing axial displacement of the shaft which passes through it and a large angular shift between the rolling axis and that of the bearing.

In certain applications, shaft support bearings are required to permit relatively large angular and longitudinal displacements of the shaft. The various bearings available in the current state of the art do not allow these requirements to be met economically.

The invention is intended to provide an economic solution to this problem in proposing a bearing conceived to this effect.

In accordance with the invention there is provided a bearing comprising a casing including means for attaching it to a support, an armature in contact with an inner face of the casing, and a sliding element receiving a ball-race, the armature and sliding element being adapted to allow the ball-race to move axially along a shaft passing through it and angularly about its centre, an elastic lining being inserted between the armature and the sliding element to take up play between the metallic elements at least partially in contact and absorbing axial and radial thrusts.

In one embodiment the casing comprises two symmetrical portions defining an internal cylindrical guide surface on which the cylindrical armature can slide, the armature containing the sliding element surrounding the ball bearing and which comprises two cups with part-spherical internal faces on which the external ring of the ball bearing can slide in angular displacement about the bearing centre, this outer ring having a part-spherical outer surface with the same radius as the internal surface of the cups, two rings of elastic material being disposed between the armature and the cups.

In a modified embodiment the casing includes two symmetrical portions defining a part-spherical internal surface on which the armature can slide in angular displacement about the centre of the bearing, the armature being in two pieces having a peripheral part-spherical surface of the same radius as the part-spherical surface of the casing and contacting the latter, the armature enclosing a cylindrical ring in which is located for sliding movement a conventional ball bearing, and an elastic ring being disposed between the armature and the ring.

Protective elements may be placed inside and outside the casing to protect the bearing against solid or liquid impurities.

Figure 2:
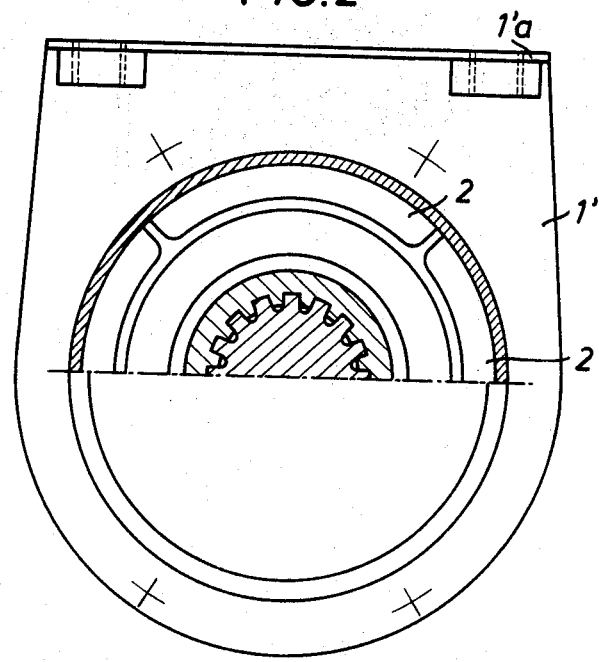
Figure 3:
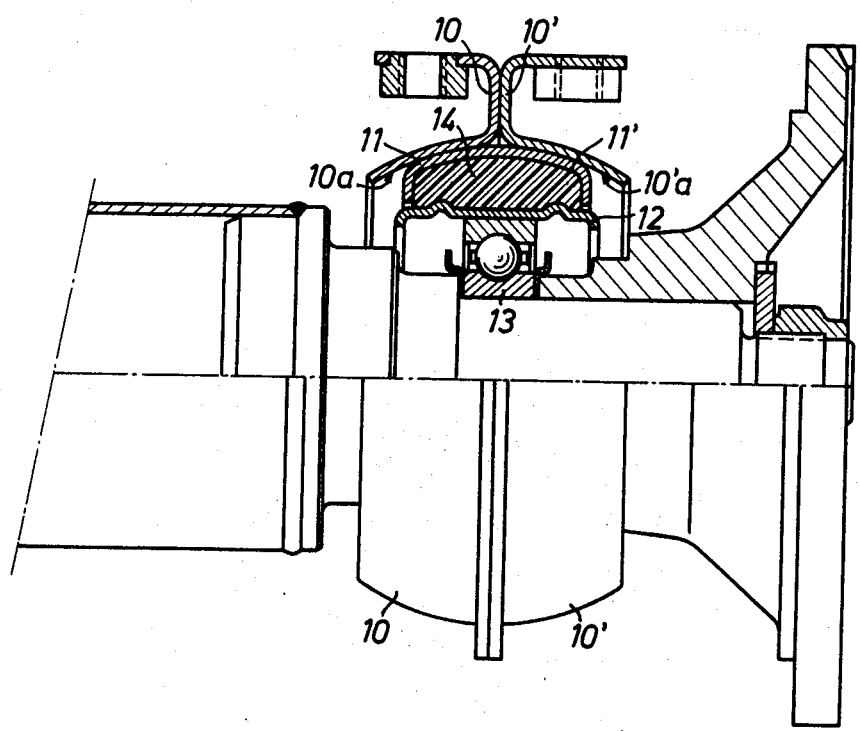

The bearing according to the present invention is described in more detail hereinafter, with reference to the accompanying drawings in which:

FIG. 1 shows a first form of bearing in part-section;
FIG. 2 is a section on the line II—II of FIG. 1; and
FIG. 3 is a modified bearing in part-section.

In one embodiment given by way of example and in no way limiting, the bearing comprises a casing which can be in one piece or, as shown in FIG. 1, two pieces 1 and 1', and provided with a device for attaching it to the element intended to support the bearing, such as a strap or beam comprising two flanges $1_a$ and $1'_a$.

The casing defines an internal guide surface which is of cylindrical form in the given example, constituted by walls $1_b$ and $1'_b$. On these walls slides a rim-shaped armature 2 in which are placed cups 3 and 3' receiving a ball bearing 4. Between the armature 2 and the cups 3 and 3' are disposed rings 5 and 5' of elastic material compressed between metal washers 6 and 6'.

The armature 2 must be sufficiently deformable so that its external surface is correctly applied to the internal surface $1_b$ and $1'_b$ of the casing under the effect of the radial pressure exerted inwardly by the elastic rings 5 and 5', so that the longitudinal sliding of the shaft is effected without play. If necessary the armature 2 must be divided into two, three or four identical segments.

The armature is of a material selected for its friction characteristics and its resistance to wear.

The external ring 4a of the ball-race 4 has a part-spherical outer surface centred on the point 0 at the intersection of the shaft axis and the median diameter of the armature 2. This outer surface contacts the inner faces of the cups 3 and 3' and the raised edges 3a and 3'a of these provide the reaction to the axial force created by the elastic rings 5 and 5'. The cups are thus held permanently in contact with the outer face of the ring 4a and any play introduced in construction or use of the bearing is taken up.

The cups 3 and 3' may be treated to resist the wear due to the rubbing against them of the outer ring of the ball-race 4.

The elastic rings 5 and 5' are intended to provide both an axial thrust on the cups 3 and 3' and a radial thrust on the armature 2. The material and geometry of the rings are selected to provide the required thrusts.

The ball-race 4 must be so made that its inner ring can be mounted on a cylindrical shaft and its outer ring loged in a spherical housing.

A ball-race with a conventional cylindrical profile may be used, bonded with a ring or a pair of half-rings machined to the requisite part-spherical profile.

To use the bearing in a dirty environment, the sliding, rolling and rotating elements can be protected against liquid or solid impurities. A sealed ball-race may be used. Alternatively, a deflector (7, 7') may be placed at each side of the bearing to protect the ball-race and to retain lubricant inside the bearing.

A deflector 8 may be added to provide a first protective barrier.

Furthermore a regreasing system may be added, if required, to the casing 1a, 1a', to lubricate the surfaces in contact and to periodically drive out any impurities which may have been introduced into the bearing.

FIG. 3 shows a modified embodiment in which a conventional ball-race 9 is used, with no modification.

The casing comprises two parts 10 and 10' of which the internal guide surfaces 10a and 10'a are part-spherical.

The armature preferably comprises two bowl-like portions 11 and 11' with part-spherical walls which engage the guide surfaces 10a and 10'a of the casing.

The cups of the first-described embodiment are replaced by a cylindrical ring 12 in which the ball-race 13 can slide.

The ring 12 must be sufficiently deformable, and if necessary split into two, three or four identical sectors, for the sliding of the ball-race 13 to take place without play under the radial face exerted by the elastic ring 14.

The elastic ring 14 is inserted between the armature 11, 11' and the ring 2 and has the same function as the rings 5 and 5' shown in FIG. 1.

This embodiment has the advantage that it enables a standard ball-race to be used since the sliding takes place between the external ring 13a of the ball-race and the internal face of the cylindrical ring 12, and the rolling takes place between the casing 10, 10' and the armature 11, 11'. The elastic element 14 provides the axial and radial thrusts as in the first-described embodiment.

The invention finds applications in all transmission of rotational movement.

There is claimed:

1. A bearing comprising:
   a casing having an inner surface in the form of a body of revolution;
   means on said casing for attaching it to a support;
   an armature in contact with said inner surface of said casing;
   a sliding element within said armature;
   an elastic member between said armature and said sliding element, adapted to take up play therebetween; and
   a ball-race carried in said armature.

2. A bearing as set forth in claim 1, wherein said casing comprises two symmetrical parts, said armature is cylindrical and contains said sliding element which comprises two cups with part-spherical internal surfaces, and said ball-race has an outer ring with part-spherical profile of the same diameter as said internal surfaces of said cups, the outer surface of said outer ring being in contact with said internal surfaces for free sliding movement thereon, elastic rings being disposed between said cups and said armature.

3. A bearing as set forth in claim 1, wherein said casing comprises two symmetrical parts having part-spherical internal surfaces and said armature has a part-spherical outer surface engaging said part-spherical internal surfaces of said casing for free sliding movement thereon, and further comprising a ring within which said ball-race is located for free axial sliding movement, said ring being located within said armature and elastic means being located between said armature and said ring.

4. A bearing as set forth in claim 1, further comprising protective elements within and without said casing to protect said ball-race from foreign matter.

* * * * *